May 12, 1964
J. A. BROCATO
3,132,843
COIL SPRING COMPRESSING TOOL
Filed Aug. 25, 1961
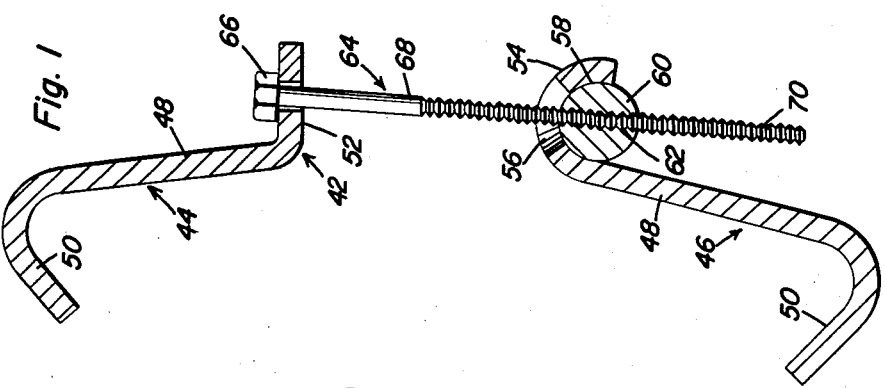
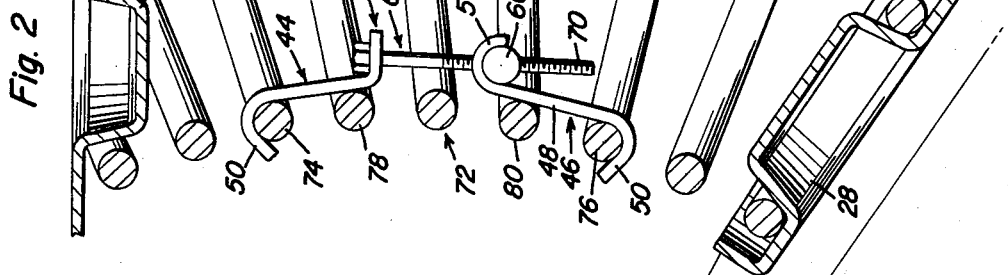
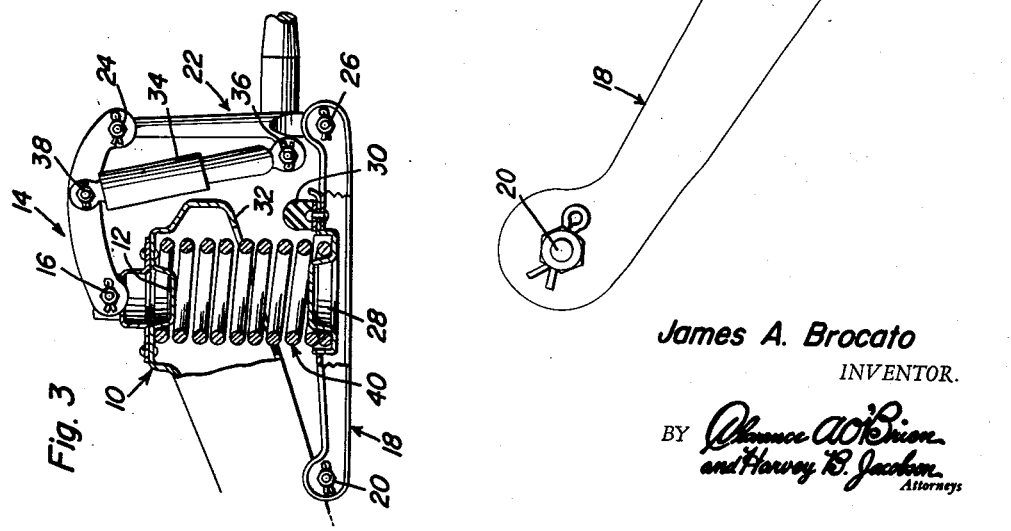
James A. Brocato
INVENTOR.

United States Patent Office 3,132,843
Patented May 12, 1964

3,132,843
COIL SPRING COMPRESSING TOOL
James A. Brocato, 726 Julia St., New Orleans 12, La.
Filed Aug. 25, 1961, Ser. No. 133,985
3 Claims. (Cl. 254—10.5)

This invention relates to a novel and useful coil spring compressing tool specifically adapted to axially compress a coil spring while simultaneously longitudinally bowing the coil spring.

When replacing the coil spring of one side of a conventional type of vehicle front wheel suspension assembly, the outer end of the A-frame against which one end of the compression spring is adapted to bear must be disconnected and swung away from the portion of the vehicle against which the remote end of the coil spring is to abut. In this manner, the coil spring need be only partially axially compressed in order to properly position the coil spring between portions of the suspension assembly against which the opposite ends of the coil spring are adapted to bear. However, as the A-frame whose outer end has been disconnected and displaced by swinging about the inner end of the A-frame has its spring seat disposed at an angle relative to the spring seat against which the remote end of the coil spring is adapted to engage, it is necessary that the coil spring be bowed in order that the opposite ends thereof will be contained in planes disposed at an angle relative to each other in order that the opposite ends of the coil spring may properly seat in the corresponding seats against which the opposite ends of the coil spring are adapted to bear.

As the coil spring compressing tool of the instant invention is constructed in a manner whereby the coil spring may be longitudinally bowed as well as axially compressed, the replacement of vehicle suspension coil springs is greatly facilitated by the tool of the instant invention. The main object of this invention is to provide a coil spring compressing tool which will be capable of being engaged with a pair of convolutions of a coil spring spaced longitudinally of the spring and moved toward each other in order that the coil spring may be axially compressed.

A further and important object of this invention, in accordance with the immediately preceding object, is to provide a coil spring compressing tool which will also be capable of longitudinally bowing a coil spring as the latter is axially compressed by the tool of the instant invention in order that the opposite ends of the coil spring may be disposed in planes at an angle relative to each other for proper mating with the angularly disposed spring seats caused by the disconnection of the outer end of one of the A-frames of the vehicle suspension system and the swinging of the outer end of that A-frame away from the opposing spring seat.

A further object of this invention, in accordance with the preceding object, is to provide a coil spring compressing tool provided with means for limiting the amount a coil spring axially compressed by means of the tool will be longitudinally bowed.

A final object to be specifically enumerated herein is to provide a coil spring compressing tool which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal vertical sectional view of the coil spring compressing tool;

FIGURE 2 is a fragmentary vertical sectional view of a portion of a vehicle suspension system shown with the coil spring compressing tool of the instant invention operatively associated with a coil spring being mounted on the coil spring suspension assembly; and FIGURE 3 is a fragmentary vertical sectional view of a conventional type of coil spring front wheel suspension system showing the manner in which it is desired to mount a coil spring between opposing coil spring seats of the suspension assembly.

Referring now more specifically to the drawings and to FIGURE 3 in particular, there will be seen a vehicle frame horn generally referred to by the reference numeral 10 which has a truncated cone shaped spring seat 12 secured thereto. The frame horn 10 also has an upper control arm generally referred to by the reference numeral 14 pivotally secured thereto as at 16 and the upper control arm 14 extends outwardly away from the frame horn 10.

A lower A-frame generally referred to by the reference numeral 18 is pivotally secured at its inner end to the frame as at 20 and a spindle assembly generally referred to by the reference numeral 22 has its upper and lower ends pivotally secured between the free ends of the upper control arm 14 and the lower A-frame 18 as at 24 and 26 respectively.

The lower A-frame 18 is also provided with a truncated cone shaped seat which is referred to by the reference numeral 28 and additionally includes a rubber bumper 30 adapted for engagement with the abutment portion 32 on the frame horn 10. A shock absorber 34 is pivotally secured between the spindle assembly 22 and the upper control arm 14 as at 36 and 38 respectively and it will also be noted that a coil spring generally referred to by the reference numeral 40 is disposed between the spring seats 12 and 28.

When it is desired to replace the coil spring 40, the pivotal connection at 26 is removed and the outer end of the lower A-frame 18 is pivoted downwardly as illustrated in FIGURE 2 of the drawings. With the outer end of the lower A-frame 18 downwardly and outwardly inclined, the spring seats 12 and 28 are disposed at an angle relative to each other.

Heretofore, various types of tools were utilized to axially compress a coil spring and to maintain the coil spring in an axially compressed state during the time the coil spring would be placed between the spring seats 12 and 28 when positioned as illustrated in FIGURE 2 of the drawings. However, these previous coil spring compressing tools were not also provided with means for longitudinally bowing the coil spring and accordingly, the opposite ends of the coil springs would be disposed in parallel planes and would thus not be disposed in positions to properly mate with the angularly disposed spring seats 12 and 28.

With attention now directed to FIGURES 1 and 2 of the drawings it will be seen that the coil spring compressing tool of the instant invention is generally referred to by the reference numeral 42. The tool 42 is in the form of an adjustable clamp assembly and includes a pair of convolution gripping or abutment members generally referred to by the reference numerals 44 and 46. Each of the gripping members 44 and 46 comprises a hook member having an elongated shank portion 48 and a back-turned hook portion 50. The hook portions 50 open toward each other and it will be observed that one of the adjacent ends of the shank portions 48 includes a laterally directed and apertured ear or flange 52 while the other adjacent shank end portion includes a smoothly curved back-turned end portion 54 which is provided with a longitudinal slot 56. The back-turned end portion 54 defines a generally semi-cylindrical pocket or recess 58 and a generally cylindrical abutment member 60 is rotatably received within the pocket 58 and is provided with a threaded diametric bore 62. Interconnecting means generally referred to by the reference numeral 64 and in the form of a bolt including a diametrically enlarged head portion 66 and a shank portion 68 is utilized to adjustably position the hook members 44 and 46 relative to each other. The shank portion 68 includes a threaded end portion 70 and the shank portion 68 is secured through the apertured lug 52 while the threaded portion of the shank 68 is threadingly secured through the diametric bore 62.

As can best be viewed from FIGURE 2 of the drawings when the replacement compression spring generally referred to by the reference numeral 72 is axially compressed by means of the tool 42, it will also be longitudinally bowed. The hook members 44 and 46 engage convolutions 74 and 76 of the coil spring 72 at points spaced longitudinally along the compression spring 72 and disposed on one side thereof. As the bolt 64 is turned to pull the adjacent ends of the hook members 44 and 46 toward each other, the coil spring 72 is axially compressed as well as longitudinally bowed as viewed in FIGURE 2 of the drawings. However, it will be noted that the convolutions 78 and 80 of the spring 72 engage the shank portions 48 of the hook members 44 and 46 and limit the amount the spring 72 is longitudinally bowed by axially compressing the spring 72 with the tool 42.

It will be noted that during the process of axially compressing the coil spring 72 as well as longitudinally bowing the latter, that the generally cylindrical abutment member 60 will rotate slightly within the pocket 58. Accordingly, the shank 68 will be swung slightly longitudinally through the slot 56 during tightening of the bolt 64. After the coil spring 72 has been positioned between the spring seats 12 and 28 as viewed in FIGURE 2 of the drawings, the free end of the lower A-frame 18 may be jacked upwardly toward the spring seat 12. As tension is relieved from the tool 42, it may be removed from between adjacent convolutions of the spring 72 and the free end of the lower A-frame 18 may be further jacked into proper position for again establishing the pivotal connection at 26.

Although the tool 42 has been illustrated as disposed within the coil spring 72, it is to be noted that the tool 42 could also be used if the bolt 64 were disposed exteriorly of the convolutions of the spring 72. However, in this instance no abutment means limiting longitudinal bowing of the spring 72 would be provided. Accordingly, if it is desired to bow the compresssion spring 72 more than illustrated in FIGURE 2 of the drawings, the tool 42 may be disposed exteriorly of the coil spring 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A compression spring compressing tool comprising an adjustable clamp assembly including a pair of hook members including generally axially aligned substantially straight shank portions spaced apart at their adjacent ends and including backturned hook portions on their remote ends projecting outwardly of corresponding sides of said shank portions and opening toward each other adapted to snugly receive corresponding portions of a pair of convolutions of a compression spring having two or more convolutions of said spring disposed therebetween, one of said adjacent ends including an apertured laterally directed portion projecting to the side of said one end portion opposite to the side thereof to which the corresponding hook portion projects, the other of said adjacent ends including a smoothly curved backturned end portion defining a semi-cylindrical pocket opening toward and opposing said apertured laterally directed portion and having a circumferential slot formed therein intermediate its opposite ends, an abutment member including a generally cylindrical portion seated in said pocket and having a transverse bore formed therethrough registered with said slot, a bolt extending through said apertured laterally direction portion and said slot and said transverse bore and being secured to said abutment means, said shank portions each being of a length adapted to span at least two adjacent convolutions of said spring.

2. The combination of claim 1 wherein said bore is threaded and the corresponding end of said bolt is externally threadedly and threadedly engaged with the threads in said bore.

3. The combination of claim 2 wherein the end of said bolt remote from the corresponding end thereof includes a diametrically enlarged head portion of a size too great to pass through said apertured laterally directed portion.

References Cited in the file of this patent

UNITED STATES PATENTS

| | | |
|---|---|---|
| 775,355 | Smith | Nov. 22, 1904 |
| 1,285,517 | White | Nov. 19, 1918 |
| 1,817,628 | Kessler et al. | Aug. 4, 1931 |
| 1,929,026 | Marcil | Oct. 3, 1933 |
| 2,631,806 | Harder et al. | Mar. 17, 1953 |